United States Patent [19]

Mickus

[11] 4,087,928
[45] May 9, 1978

[54] MULTI-SECTIONAL RESILIENT RETAINER FOR EXCAVATING TOOTH

[75] Inventor: Donald J. Mickus, Chicago, Ill.

[73] Assignee: International Harvester Company, Chicago, Ill.

[21] Appl. No.: 785,386

[22] Filed: Apr. 7, 1977

[51] Int. Cl.² .......................... E02F 9/28; F16B 19/00
[52] U.S. Cl. ................................... 37/142 A; 85/8.3; 299/92
[58] Field of Search ............ 37/142 A, 142 R, 141 R, 37/141 T; 299/92; 172/713; 85/8.3, 1 F; 403/404, 408, 357, 326, 291, 297, 376; 24/213 R, 213 B, 213 CS

[56] References Cited

U.S. PATENT DOCUMENTS

| 2,716,822 | 9/1955 | Launder et al. ................... 85/8.3 X |
| 2,987,332 | 6/1961 | Bonmartini ..................... 37/142 A X |
| 3,020,655 | 2/1962 | Launder ............................ 37/142 A |
| 3,232,160 | 2/1966 | Fork et al. ............................ 85/8.3 |
| 3,733,722 | 5/1973 | Launder ............................ 37/142 A |
| 3,954,345 | 5/1976 | Morris ................................. 403/297 |

Primary Examiner—E. H. Eickholt
Attorney, Agent, or Firm—John W. Gaines; Ronald C. Kamp; F. David AuBuchon

[57] ABSTRACT

Multi-sectional resilient retainer pin for excavating tooth, whereof the multiple sections define a ring effective for 360° lateral stability of the pin and solid self-centering and self-retention.

9 Claims, 8 Drawing Figures

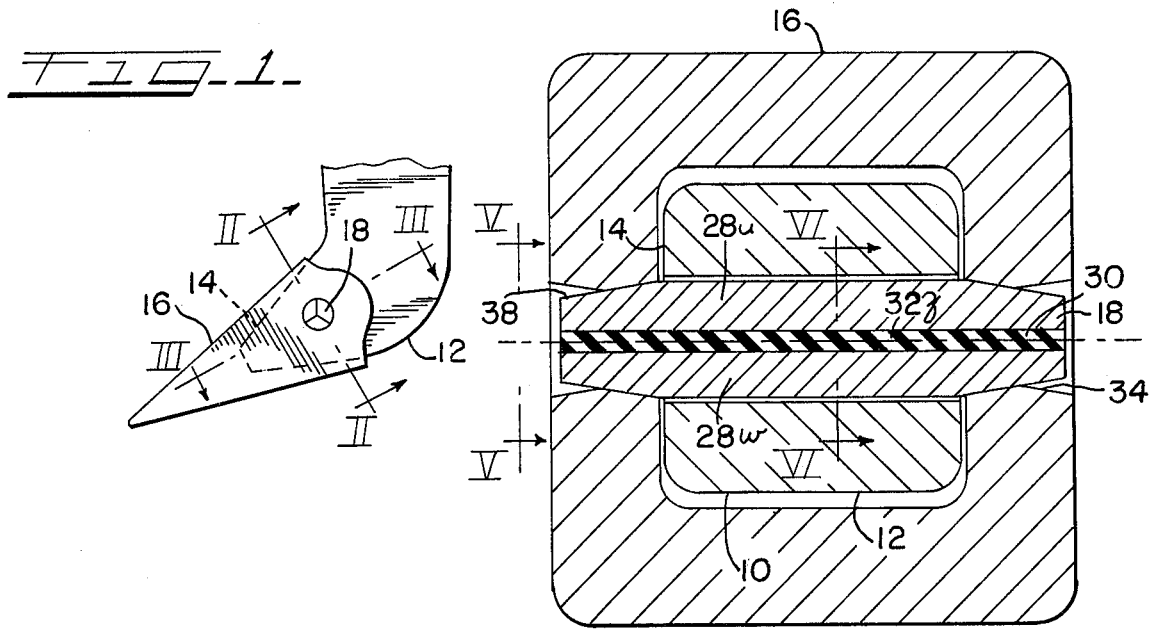
Fig. 1.
Fig. 2.
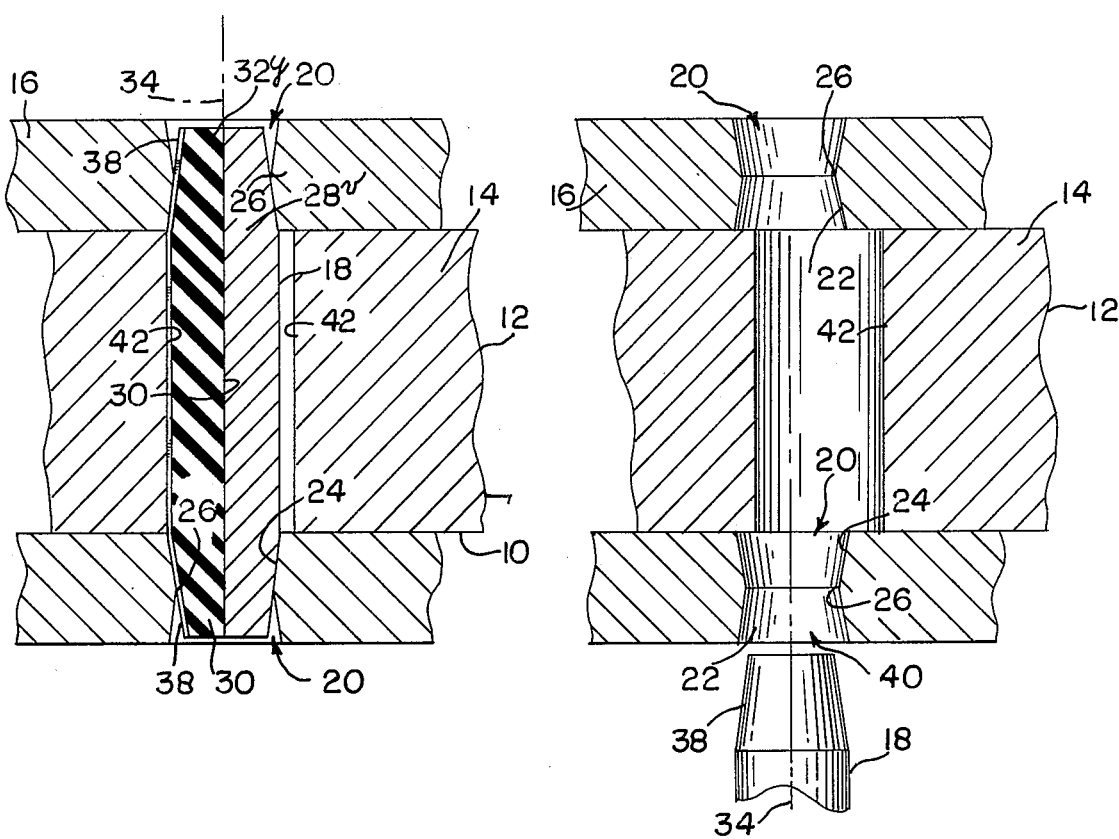
Fig. 3.
Fig. 4.

U.S. Patent May 9, 1978 Sheet 2 of 2 4,087,928
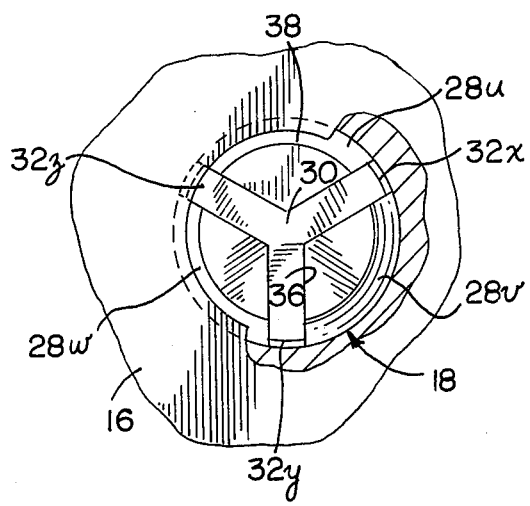
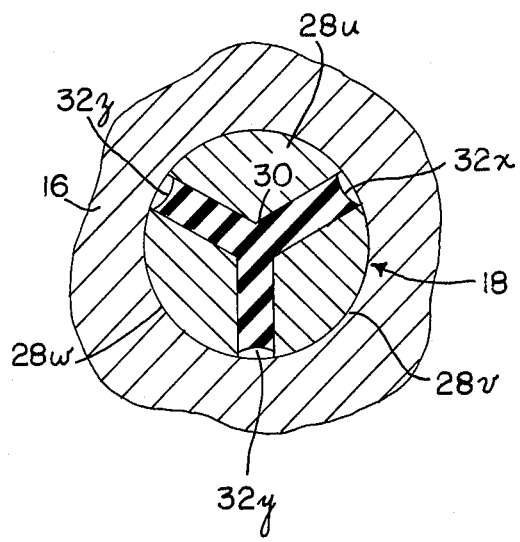
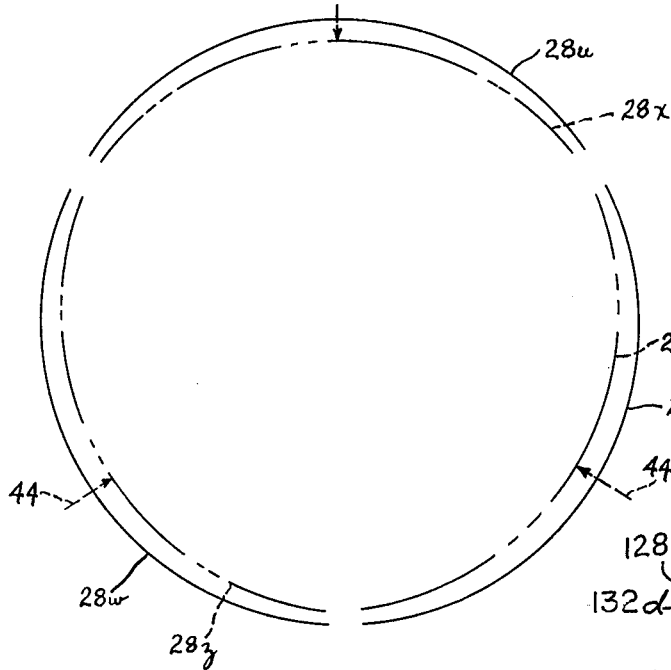
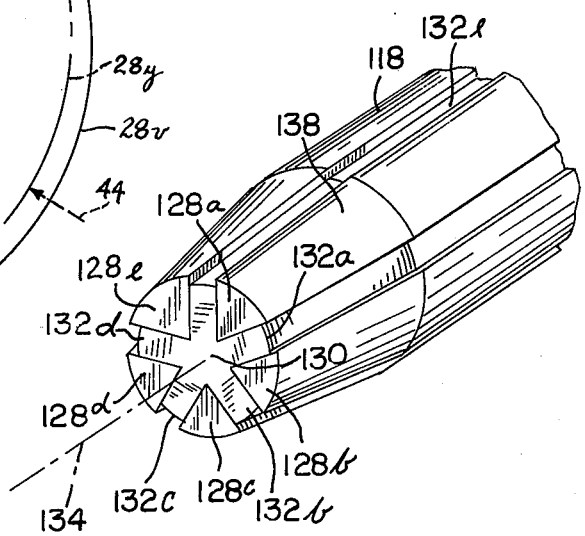

MULTI-SECTIONAL RESILIENT RETAINER FOR EXCAVATING TOOTH

This application relates to a multi-sectional resilient retainer for an excavating tooth. It more particularly relates to a resilient retainer pin in which the multiple section thereof define a ring effective for 360° lateral stability of the pin and solid self-centering and self-retention.

According to the practice, a conventional split retaining pin, sometimes referred to as a resilient pin, is designed with the bisected pin halves having a separator of rubber therebetween. The pin resiliently changes cross-sectional dimension along one line, being compressible let us say only at the line of the 90° angle, normal to the separator. It is therefore the practice dutifully to orient the pin about its longitudinal axis in installation, and it is sometimes the practice to let the installed pin stay retained through simple engagement by reason of internal compression on the rubber separator, i.e., by simple frictional engagement holding the pin to prevent it from working loose.

My reason for a ring of sector sections about the periphery of the present multi-sectional retainer invention, is to provide a pin more universal in its application, to approach more nearly to approximating a 360° expanding pin. An approximately 360° expanding pin requires no orientation, and affords novel geometry in being installed, and novel self-retaining geometry when beveled ends provided thereon are trapped between complementary sockets providing for interengaged retention of the pin under pressure at opposite ends.

Although the novel pin will hereinafter be described as primarily adapted to retain a ripper tooth, the pin is broadly for work tools, and has equal advantage in retaining an excavating tooth in general such as on a loader bucket, excavating bucket, drive line bucket, shovel dipper, or other shovel, scoop, trencher and the like requiring a replaceable tooth or digging point.

Features, objects, and advantages will either be specifically pointed out or become apparent when, for a better understanding of the invention, reference is made to the following description, taken in conjunction with the accompanying drawings which show certain preferred embodiments thereof and in which:

FIG. 1 is a side elevational view of a ripper shank with a pinned-on wear point embodying the present invention;

FIGS. 2 and 3 are cross sectional, as installed, pin views taken along the respective transverse section lines II—II and III—III appearing in FIG. 1;

FIG. 4 is a view similar to FIG. 3, but during pin installation and with the pin of FIG. 3 appearing on the outside;

FIGS. 5 and 6 are respective pin end and pin maximum cross sectional showings as viewed in the direction of the arrowed section lines V—V and VI—VI appearing in FIG. 2;

FIG. 7 is a largely schematic view similar to FIG. 6, illustrating resiliently, radially inwardly collapse of the pin sector sections simultaneously; and FIG. 8 is an isometric fragmentary view of a modified form of the resilient pin.

More particularly in FIGS. 1, 2, and 3 of the drawings, a vertically disposed ripper 10 includes an obtusely bent shank 12 adapted to penetrate the ground and be drawn through it for ripping, and having a diagonal forward male end 14. The diagonal end 14 is forward in respect of the horizontal direction of rip and at the front supports a female member in the form of a socketed wear point or tooth 16. The shank and tooth are essentially elongate parallel members.

The shank and tooth have transverse registering holes in which they mutually carry a multi-section, resilient, retaining pin 18.

REGISTERING HOLES —FIGURE 4

In this figure, the holes in the spaced apart parts of the socketed tooth 16 comprise paired registering openings 20 formed with a doubly tapered bore having reverse flares 22 and 24 each uniformly diverging from a common circular restriction 26 defining the least diameter of the opening.

MULTI-SECTIONS 13 FIGURES 5 and 6

The pin 18 is made up of a ring of identical, relatively inwardly wedgeable, sector sections 28U, 28V, and 28W, three in number, as shown, and an elastomeric body element 30 forming a spider matrix sandwiched in among the sections, which sections are hardened metal.

The elastomeric body 30 in cross section comprises three identical, angularly offset, interconnected arm sections or pads 32X, 32Y, and 32Z of predetermined radial extent terminating at angularly and substantially equally peripherally spaced apart side portions of the pin 18 so as to present in cross section a slightly undercut or recessed appearance at the ends of the arm sections. The pads 32X, 32Y, and 32Z converge from the pin side portions toward a central longitudinal axis 34 of the pin, and join each other centrally of the retainer to form in effect included angle slots 36 of identical size and occupied by the sector sections. In each such slot 36, one of the sector sections is bonded in place affording a permanent one piece composite body to the pin for individual handling and unitariness when serving as a drive pin.

DRIVE — FIGURE 4

The pin 18 has reduced noses at opposite ends, each with a gradual frusto conical taper forming a bevel 38 to enable a wedging in or pinching in of the nose. Thus, in the direction of drive indicated by an arrow 40 along the central longitudinal axis 34 of the pin and the paired openings 20, the lateral opening flare 22 will pinch down the entering nose bevel 38 and cause radially inward collapse of its trisections. The pin 18 is of rugged construction suited to withstand the pounding of a heavy sledge hammer or sledge and drift pin which drive the pin in and drive it back out when being removed.

The hole of the forward male end 14 between the spaced apart female part is a comparatively oversize opening 42. If the opening 42 is slightly out of line, the nose bevel 38 will engage the mouth of the opening 42 and gradually wedge the forward end 14 into the designed position for approximate transverse alignment.

RETAIN — FIGURE 3

At the pin end points where the pin 18 terminates in the spaced apart parts of the tooth 16, the respective bevels 38 are complementarily firmly socketed in the respective medial flares 24 so as to be physically trapped under longitudinal and circumferential compression in and between the openings 20. The pin 18 enters its installed position from pounding thereon as a drive pin, and it is removed by pounding thereon from the position as shown in FIG. 3 with the noted sledge and separate drive pin.

The left cylindrical side of the pin 18 as viewed in this figure will constantly engage only the left side of the oversize opening 42 as so viewed; hence any effort to separate the shank and tooth 16 such as by a forward pull on the latter will give rise to the pin 18 reacting the force of the pull into the shank on the left side of the oversize opening 42. The pin 18 is not in contact with the sides of the opening 42 which are to the right and up and down as viewed in FIG. 3

CIRCUMFERENTIAL COMPRESSION — FIGURES 5 and 6

When the sector sections 28U, 28V, and 28W collapse wedgingly inwardly toward one another, the elastomeric pads 32X, 32Y, and 32Z thin down by elastic flowing and thereafter, under the resulting preload, constantly urge the sections 28U, 28V, and 28W apart.

SPREADER RESULT — FIGURE 7

Although the elastic body element 30 acting as separator is not illustrated in this figure, the overall results of inward collapse can be readily appreciated from this schematic illustration. As the sections 28U, 28V, and 28W of the pin are constricted in being passed through the tooth openings, the collapsing force is repesented by the resultant compression vectors as shown by the radially disposed, broken line arrows 44. The sections, as they appear in their broken line outlines as shown at 28X, 28Y, and 28Z, take a maximum depressed or collapsed position and then, as they spring back toward their trapped position at final installation, they take a partway expanded position, not shown, between their respective positions 28U, 28V, 28W on the one hand, and 28X, 28Y, and 28Z on the other hand.

In one preferred form of the invention, the space between the medial flares 24 is so sized that the sections 28U, 28V, and 28W snap back nearly wholly if not completely wholly to their uncollapsed diameter when solidly seated in the receiving flares. In any case however, the flares 24 and bevels 38 are formed with identical angles of taper to one another, e.g., with a cone apex angle of 15°, mutually.

It is important to note that the overall diameter of the pin is reduced, throughout 360°, in comparison to the bisected resilient pins which do not change dimension whatever along one diameter. Hence, the present pin is particularly adapted for entry with all around side clearance through a constricted circular opening.

Installed, the pin is under axial compression because of the equal and opposite longitudinal forces exerted by the restricted openings on the interengaging opposite pin bevels 38.

OVERALL OPERATION

When the tooth 16 or female member is initially placed on the ripper shank 12, the complementary tooth socket will fit far enough onto the forward tapered end 14 of the shank to cause the paired openings 20 of the tooth to overlap the oversize opening 42 in the forward end 14. In some instances, it may be found that the paired openings 20 will be slightly forwardly of the oversize opening 42 and, in those instances, the axes including the paired opening axis 34 of the openings will be parallel but not aligned.

In either case, aligned or not aligned, the pin 18 is then driven crosswise of the tooth into the openings from one of the lateral outer surfaces of the tooth 16. The pin is considerably larger throughout its circumference in its free position than the restriction 26 of the respective paired openings 20. Consequently, the bevel 38 is pinched down (FIG. 4) as it enters the confronting opening 20. The elastomeric body element pads adjacent the pin nose are compressed chordwise to allow inward collapse of the sections at the nose as the bevel 38 enters further through the apex 26 of the constriction. The bevel 38 of course facilitates movement of the pin 18 into the opening without interference from the restriction or from the nonaligned, if so nonaligned, oversize opening 42 of the shank 12.

As the pin continues to move transversely from the position of FIG. 4, the entire bevel 38 will pass through the restriction 26 and will strike the mouth of the opening 42 and continue with a wedging action. The pin 18 will take its least diameter when midway through the restriction 26 and will continue with essentially this same minimum diameter until it is interengagingly trapped between the paired openings 20 as shown in FIG. 3. With the pin 18 under axial compression and circumferential compression, each bevel 38 will be self-centering within the restriction 26 of each opening 20 and self-retaining because of the respective radially inward and axially inward components of reaction of the medial flare 24 of each opening 20. Vibrational and other loads on the tightly fitting pin 18 will not cause it to become dislodged because of the preload on the spreader or element 30. In other words, the circumferential preload on each bevel is attempting to squeeze the pin at that end inwardly because of the taper, and no looseness of the resilient pin can develop in service.

Compared to the outer ends of the point openings 20, the pin is relatively foreshortened at the corresponding ends. In other words, each pin bevel 38 from where it protrudes through the restriction 26 projects therepast only about three-fourths of the distance through the lateral flare 22.

When the tooth 16 has worn and is to be removed, its disassembly is accomplished easily by driving out the pin 18 transversely of the shank and through one of the openings 20. Reacting as a drive pin from the blows, the sections of the pin 18 will radially collapse inwardly and, in the order in which they exit, the leading bevel, the main body of the pin, and the trailing bevel will pass through and past the least diameter of the exit opening 20 at restriction 24.

When the pin 18 has been removed, the tooth is simply pulled off the forward male end 14 of the shank, which then is ready to accept a replacement tooth. The pin 18 may be used over and over in securing successive teeth to the shank.

As long as there are sufficient bevel contacts made against the flare to define a ring of contacts such as represented by the three vectors 44 in FIG. 7, the only thing really critical is that there be more than two such contacts. They will be established in the form of three line contacts with the flare or else partial or full surface contacts, depending upon the machining of the pin in terms of its finally socketed overall bevel shape.

Increasing the number of such contacts increases the lateral stability of the pin structure and also its self-centering and self-retention. Although more complex in structure, a modified version for the purpose will now be described.

MODIFICATION —FIGURE 8

In the modified form of the invention as shown in this figure, the previous wedging angle of 120° is approximately halved to 72° in the illustrated retaining pin 118. That is to say, when we consider any three consecutive sections in the ring of wedging sections 128A, 128B, 128C, 128D, and 128E illustrated, the intervening one of the three consecutive sections in the ring tends to wedge-in between the two adjacent wedge sections at appreciably less than at a straight angle to each of its two adjacent wedge sections, i.e., at a 72° angle to each. These sections are identical to one another, and the sections 132A, 132B, 132C, 132D, and 132E of the elastomeric element sandwiched in among the metal sections are angularly offset so as to define equal included angles and they join one another centrally of the pin 118.

Each end bevel, of which the near one 138 is shown, will establish five equally spaced apart contacts as it laterally self-centers in a corresponding socket sharing the axis 134. Thereafter, upon being axially removed, the sections as they limitedly collapse radially inwardly will continue to define a closed figure still substantially as circular as the exit opening, and reduced to no more than the circular size of the latter for a tight fit therein and for successful passage therethrough.

Variations within the spirit and scope of the invention described are equally comprehended by the foregoing description.

What is claimed is:

1. In a digging tooth comprising a support member, a work tool having a socket and receiving therein a forward end of said support member, and a retainer pin in reception in bores formed, with respect to the thus received retainer, at aligned central and end points, respectively, through said support member and said work tool which thus carry the retainer, the improvement characterized wherein the retainer pin comprises:
    a unitary multi-sectional expanding retainer with an elastomeric element sandwiched in among metal sections thereof, said elastomeric element comprising at least three in number of angularly offset sections of predetermined radial extent substantially terminating at angularly and substantially equally peripherally spaced apart side portions of said retainer, said elastomeric sections converging from said side portions toward a central longitudinal axis of said retainer, and joining each other centrally of said retainer to form included angle slot means;
    said metal sections of the unitary multi-sectional retainer being of like number to the elastomeric element sections, and being unitarily permanently bonded thereto and complementarily occupying all of said included angle slot means so as to form a permanent one-piece body for individual handling.

2. The invention of claim 1, further characterized by:
    said retainer having reduced noses at opposite ends, each with gradual frusto-conical taper enabling such a wedging-in of each nose, when pressed into a generally circular opening, as to cause adjacent portions of the elastomeric sections to thin by yielding under pressure, whereby the metal sections limitedly collapse radially inwardly to define a closed figure still substantially as circular as the opening but reduced to no more than the size thereof for a tight fit therein and for passage therethrough.

3. For use in pinning into retention together two elongate substantially parallel members one a male member, and the other a female member with spaced apart parts receiving a part of the male member therebetween, there being holes in said parts of the female member in communication with a hole in said part of the male member and sufficiently mutually alignable for the passage therethrough and the retention therein of a pin received in the passage so as to be jointly oriented therewith in a direction transversely of the members; the improvement in pin structure to effect such retention comprising:
    a retaining pin including a ring of relatively inwardly wedgeable section sections, and a spider matrix with, as viewed in cross section, radiating arm pads complementarily receiving the ring of wedgeable sector sections and effective yieldingly to urge them radially apart;
    the spider matrix of said pin comprising an included body of material therein, of which said pads are permanently bonded to and connected among the wedgeable sector sections in the ring;
    said body of material with its permanently bonded-in pads comprising an elastomer elastically enabling each intervening wedge section of any three consecutive sections in the ring to simultaneously tend to wedge-in between the two adjacent wedge sections at appreciably less than at a straight angle to each of its two adjacent wedge sections.

4. The invention of claim 3, in which said retaining pin is characterized by having:
    a bevel forming a nose at each end enabling the sector sections when forceably socketed at that end to establish solid seating of the bevel in the socket in a ring of cooperating contacts therewith so as to pinch the nose for self-centering of the ring.

5. Digging tooth or the like comprising, in combination:
    a support member;
    a work tool having a socket and receiving therein a forward end of said support member; and
    a retainer pin in reception in openings formed, with respect to the thus received retainer, at aligned medial portion and bevel end pin sections, respectively, through said support member and said work tool which thus carry the retainer;
    the opening in the work tool at each bevel end pin section defining a medially flaring frusto-conical socket forming a solid end seat for the pin and having a restriction defining the least diameter of that opening;
    each bevel end pin section having a frusto-conical angle of the same general order as its corresponding medially flaring frusto-conical socket and being complementarily seated therein at that end so that, as carried by the support member and work tool, the pin is interengagingly trapped under longitudinal compression thereby between said opening restrictions of least diameter.

6. In combination, a pair of elongate substantially parallel members one a male member, the other a female member with spaced apart parts receiving a part of the male member therebetween;
    there being paired openings in said parts of the female member in communication with an opening in said part of the male member, at least one of said paired openings formed with a doubly tapered bore having reverse flares each diverging outwardly from a common restriction defining the least diameter of that opening; and a pin including ring of relatively moveable sector sections entered in said openings, and interconnected yieldable pad means among the sector sections yieldingly urging them apart, one end of said pin fitting in said one opening of the paired openings, and a nose bevel on said one end of the pin complementarily socketed in one of the reverse flares so as to cause the nose to pinch-in and self-center in the common restriction at the point where said pin end passes through same.

7. The invention of claim 6, wherein the material of said interconnected yieldable pad means is characterized by:

an elastomer elastically enabling each intervening sector section of any three consecutive sector sections in the ring when pinched-in to simultaneously tend to wedge-in between the two adjacent sector sections at appreciably less than at a straight angle to each of its two adjacent sector sections.

8. Digging tooth or the like comprising, in combination:

a support member;

a work tool having a socket and receiving therein a forward end of said support member;

a multi-sectional retainer pin in reception in openings formed, with respect to the thus received retainer, at aligned medial and end points, respectively, through said support member and through said work tool which thus carry the retainer;

the opening in the work tool at each end point of the pin defining a medially flaring frusto-conical socket having a generally circular restriction defining the least diameter of that opening; and a bevel at said end point of each end portion on the pin complementarily socketed in the frusto-conical socket at that end so that, as carried by the support member and work tool, the pin is interengagingly trapped thereby under longitudinal compression between said opening restrictions of least diameter.

9. The invention of claim 8, the retainer pin characterized by having:

a ring of relatively moveable sector sections providing its multi-sectional arrangement; and interconnected elastomer pads among the sector sections yieldingly urging them apart;

the interengaged frusto-conical sockets, when the pin is trapped thereby, simultaneously causing the end portion bevels to pinch-in and self-center effectively throughout 360° in the opening restrictions of least diameter at each end point where the pin end passes through same.

* * * * *